United States Patent
He et al.

(10) Patent No.: US 8,544,081 B2
(45) Date of Patent: Sep. 24, 2013

(54) SECURE NETWORK ARCHITECTURE

(75) Inventors: Liwen He, Ipswich (GB); Bryan Littlefair, Bury St Edmunds (GB); Thomas Martin, Ipswich (GB); Dinesh Kallath, London (GB); Christopher Rutherford, Malvern (GB)

(73) Assignee: BRITISH TELECOMMUNICATIONS public limited company, London (GB)

(\*) Notice: Subject to any disclaimer, the term of this patent is extended or adjusted under 35 U.S.C. 154(b) by 1016 days.

(21) Appl. No.: 12/515,449

(22) PCT Filed: Nov. 20, 2007

(86) PCT No.: PCT/GB2007/004441
§ 371 (c)(1),
(2), (4) Date: May 19, 2009

(87) PCT Pub. No.: WO2008/062175
PCT Pub. Date: May 29, 2008

(65) Prior Publication Data
US 2010/0037311 A1 Feb. 11, 2010

(30) Foreign Application Priority Data

Nov. 20, 2006 (GB) .................................. 0623101.3
Mar. 29, 2007 (EP) .................................. 07251372

(51) Int. Cl.
*H04L 9/00* (2006.01)
*H04L 29/06* (2006.01)
*G06F 15/16* (2006.01)
*H04L 12/66* (2006.01)
*G06F 13/00* (2006.01)

(52) U.S. Cl.
USPC ............. 726/15; 713/151; 713/153; 713/154; 709/227; 709/228; 709/229

(58) Field of Classification Search
USPC ........... 726/15; 713/153, 154, 151; 709/227, 709/228
See application file for complete search history.

(56) References Cited

U.S. PATENT DOCUMENTS

| 5,864,683 | A | 1/1999 | Boebert et al. |
| 6,823,462 | B1 * | 11/2004 | Cheng et al. ............. 726/15 |

(Continued)

FOREIGN PATENT DOCUMENTS

| EP | 1 455 483 A2 | 9/2004 |
| EP | 1 494 420 A2 | 1/2005 |

(Continued)

OTHER PUBLICATIONS

Jehangir, Assed ; de Groot, S.M.H.; "Securing Personal Network clusters"; Security and Privacy in Communications Networks and the Workshops, 2007. SecureComm 2007. Third International Conference on Digital Object Identifier: 10.1109/SECCOM.2007.4550350; Publication Year: Aug. 2007; pp. 320-329.*

(Continued)

*Primary Examiner* — Nirav B Patel
*Assistant Examiner* — Courtney Fields
(74) *Attorney, Agent, or Firm* — Nixon & Vanderhye P.C.

(57) ABSTRACT

The present invention provides a star-connected network (C1-C4, P1-P8) having a number of peripheral nodes (P1-P8) and a central control arrangement (C1-C4). Each peripheral node has means for restricting communications across the network to the central control arrangement using a respective encrypted connection unless the peripheral node has received explicit authorisation from the control arrangement to set up a direct connection with another peripheral node. The central control arrangement comprises: means for establishing an encrypted connection with each peripheral node; means for exchanging control packets with two or more peripheral nodes using two or more respective encrypted connections in order to set up an authorised connection between two peripheral nodes; a database storing security policy information specifying what connections between peripheral nodes are allowable; and authorisation means for authorising connections which are allowable according to the stored security policy information using the control packet exchanging means.

12 Claims, 6 Drawing Sheets

(56) References Cited

U.S. PATENT DOCUMENTS

| | | |
|---|---|---|
| 2001/0018746 A1 | 8/2001 | Lin |
| 2002/0042875 A1* | 4/2002 | Shukla .......................... 713/151 |
| 2002/0069278 A1 | 6/2002 | Forslö w |
| 2003/0018788 A1* | 1/2003 | Zsohar .......................... 709/227 |
| 2003/0041136 A1 | 2/2003 | Cheline et al. |
| 2003/0177389 A1 | 9/2003 | Albert et al. |
| 2004/0003288 A1 | 1/2004 | Wiseman et al. |
| 2004/0073642 A1 | 4/2004 | Iyer |
| 2004/0225895 A1 | 11/2004 | Mukherjee et al. |
| 2004/0230797 A1 | 11/2004 | Ofek et al. |
| 2004/0260747 A1 | 12/2004 | Ying et al. |
| 2005/0025069 A1 | 2/2005 | Aysan |
| 2005/0028003 A1 | 2/2005 | Wray |
| 2005/0114546 A1 | 5/2005 | Chen |
| 2005/0132229 A1 | 6/2005 | Zhang et al. |
| 2005/0149757 A1 | 7/2005 | Corbett et al. |
| 2005/0152284 A1 | 7/2005 | Kotha et al. |
| 2006/0029062 A1 | 2/2006 | Rao et al. |
| 2006/0167784 A1 | 7/2006 | Hoffberg |
| 2008/0034419 A1 | 2/2008 | Mullick et al. |

FOREIGN PATENT DOCUMENTS

| | | |
|---|---|---|
| EP | 1 657 880 A1 | 5/2006 |
| JP | 2006067605 A * | 3/2006 |
| WO | WO 03/003660 A1 | 1/2003 |

OTHER PUBLICATIONS

International Search Report for PCT/GB2007/004422, mailed Jan. 10, 2008.

International Search Report for PCT/GB2007/004441, mailed Jan. 10, 2008.

Office Action dated Nov. 30, 2011 issued in related U.S. Appl. No. 12/515,458.

Kagal et al., Computer, "Trust-Based Security in Pervasive Computing Environments," Dec. 2001, pp. 154-157.

Product—Wave Embassy Security Center, "Trusted Computing: Trusted Platform Policy Management and Strong Authentication," Date Unknown, 3 pages.

Netilla Networks, Inc., "The Future of Secure Application Access Management," A Netilla Networks White Paper, 2003, pp. 1-13.

Juniper Networks, "Firewall/VPN Feature Brief," Jan. 2005, 3 pages.

Check Point Software Technologies Ltd., "Achieving Network and Application Protection: How Network-Based Solutions Mitigate Risk for Internet Data Center Environments," 2004, pp. 1-14.

* cited by examiner

SECURE NETWORK ARCHITECTURE

This application is the U.S. national phase of International Application No. PCT/GB2007/004441 filed 20 Nov. 2007, which designated the U.S. and claims priority to Great Britain Application No. 0623101.3, filed 20 Nov. 2006 and European Application No. 07251372.4, filed 29 Mar. 2007, the entire contents of each of which are hereby incorporated by reference.

TECHNICAL FIELD

The present invention relates to network security, and particularly but not exclusively to the provision of a secure virtual network (eg Intranet) over an insecure network or collection of networks (eg Internet).

BACKGROUND

Network security is an on-going issue for users of public and private networks. Virtual Private Networks (VPN) can be used to extend a private network over the Internet to allow a remote user to access the private network for example. Typically once the remote user has negotiated the firewall, the user then has full access to the private network. Similarly users connected within the private network typically also have full access to this network, or their access is restricted based on security provisions installed at individual resources within the private network.

Distributed private networks such as wide area networks (WAN) typically use leased lines to couple geographically distant local area networks (LAN), however this is expensive an typically requires co-ordinated setting of the firewall rules at each site which can be complex and may diverge over time due to differing local requirements and leading to connection difficulties.

SUMMARY

In general terms in one aspect the present invention provides a star connected network in which a central server node is coupled to a plurality of client nodes using respective encrypted connections such as secure socket layer (SSL) sessions over the Internet for example. External communications of the client nodes are restricted to using the respective encrypted connection with the server node, and therefore packets between two client nodes are routed via the server node, at least in order to initiate a connection. The server node includes means for establishing encrypted connections with each client node, for example a VPN server such as an SSL server. Packets to/from the client nodes are routed from/to the VPN server through a firewall which permits or denies both incoming and outgoing packets according to a plurality of rules. These rules are dependent on the establishment of respective encrypted connections, thus for example packets not associated with an established encrypted connection may be blocked or denied. The rules are also dependent on a security policy which may include additional restrictions dependent on the client nodes involved in sending/receiving the packets, for example whether the client node corresponds to an employee having certain restrictions placed on access to other client nodes, or to remotely connected client nodes. This arrangement allows the security policy for all the client nodes of the network to be controlled centrally using the firewall.

In an embodiment the virtual private network server is an SSL server which is configured to receive and send all packets via the firewall. The VPN server is also configured to generate a list of established encrypted connections which can be input into a security policy engine for implementing the security policy in order to generate a set of rules which are used to update the existing rules in the firewall.

In an embodiment each client node comprises authentication information securely stored in a tamper-resistant hardware module for authentication for establishing an encrypted connection with the server node. The tamper resistant hardware module may restrict external access to the server node, and may sign a public certificate using a securely stored private key in order to enable the server node to verify the public certificate is from the respective client node by using the respective public key associated with the private key.

In an embodiment the security policy engine comprises a high level engine such as KeyNote™ from AT&T labs for returning a permit or deny decision in response to a client identifier such as the client's public key and a number of session parameters provided by a context handler or other software module having received an indication of establishment of a virtual private network corresponding to the identified client. The context handler processes or translates the client identifier and session parameters into queries having a predetermined format for the policy engine, and translates the returned decisions into corresponding updated firewall rules. The session parameters include: destination addresses; session type; application type for session; port number.

Preferably, once the server has authorised a connection for a specific application (i.e. after receiving a permit decision from the security policy engine) it records the session parameters used to obtain the permit decision as a current session parameter set and subsequently checks each incoming packet (in either direction) to ensure that it matches one of it's stored current session parameter sets. This is conveniently done by determining an application identifier which identifies the application to or from which the packets are destined or originate; in particular, in an embodiment, this can be done by checking that the socket identifiers (source and destination IP addresses and port numbers) for each packet match one of the current session parameters, since these uniquely associate each packet with an associated application. When the server detects that an application wishes to finish a particular connection, e.g. by observing a TCP connection being torn down or upon expiry of a time-out duration during which a connection is unused, the server may delete the corresponding session parameter set so that only reasonably current sets are stored. Preferably, any packets which the server or firewall receives which do not match one of the stored current session parameter sets are discarded.

In an embodiment the star connected network is implemented on one or more interconnected packet switched mesh networks using virtual local area networks (VLAN) to support the encrypted connections. The VLANs are implemented at layer 2 which increases the speed of data communication across the encrypted connections between the client and server nodes.

In another aspect there is provided a server node for a star-connected network having a number of client nodes; and which comprises means for establishing an encrypted connection with each client node such as a VPN server, the VPN server arranged to route packets between two client nodes via a firewall and using two respective encrypted connections, the firewall arranged to block or allow said packets depending on a plurality of rules, the packets using both encrypted connections being routed through the firewall, and the rules being dependent on the establishment of the respective encrypted connections with the client nodes and according to a predetermined security policy.

In another aspect there is provided a client node for a star-connected network having a plurality of client nodes and a server node; the client node comprising means for restricting communications across the network to the server node using an encrypted connection, and means for routing packets to another client node via the server node using the encrypted connection. In an embodiment the client node includes a tamper resistant hardware module to enforce this restriction and routing, and to provide authentication credentials for establishing the encrypted connection.

In an alternative embodiment, an external communication is initially made by a peripheral node (corresponding to a client node of the first embodiment) to the central control node (corresponding to the server node), but instead of requiring all subsequent packets to also go via the central control node through encypted SSL connections between the central control node and each communicating peripheral node respectively, in this embodiment, the initial connection to the control node is used to set up a (usually more direct) connection between the two communicating peripheral nodes (behaving as peering nodes or with one behaving as a client and the other as a server). The trusted computing module may be used to enforce a policy whereby connections to destinations other than the central control node can only be set up after explicit authorisation from the central control arrangment. Preferably this includes requiring all of the nodes involved in a connection (which need not go via the central control node/arrangement) receiving explicit authorisation to transmit, receive and/or forward appropriate data packets as required. Preferably such authorisation is time-limited and upon expiry of the authorised time, new authorisation is required from the central control node/arrangement.

In a further alternative embodiment, instead of having a single central control node, there is a plurality of central control nodes which are interconnected and behave, from the perspective of the peripheral nodes and for network activity logging purposes, as a single node.

Thus, according to these alternative embodiments, there is provided a star-connected network having a number of peripheral nodes and a central control arrangement; wherein each peripheral node has means for restricting communications across the network to the central control arrangement using a respective encrypted connection unless the peripheral node has received explicit authorisation to establish another connection from the central control arrangement; and wherein the central control arrangement comprises: means for establishing an encrypted connection with each peripheral node; means for exchanging control packets with two or more peripheral nodes using two or more respective encrypted connections in order to set up an authorised connection between two peripheral nodes; a database storing security policy information specifying what connections between peripheral nodes are allowable; and authorisation means for authorising connections which are allowable according to the stored security policy information using the control packet exchanging means.

In this arrangement, the peripheral nodes may act as clients, servers, peers or proxy servers depending on the functions they are required to carry out. Each periphery node is able to set up a secure connection to the central control arrangement either by initiating the connection itself, or in response to receiving a request from the central control arrangement to set up such a connection.

Preferably the central control arrangement includes an attack detection module which is operable to analyse connection attempts which fail to be authorised and to attempt to detect any patterns in such failed attempts. In one embodiment, any detected patterns are reported to an administrator who may then set a policy of dropping or logging and then dropping any subsequent connection attempts matching that pattern, without sending any responses or performing any encryption related processing. In an alternative arrangement the attack detection module may automatically apply such a policy, instead of relying on a human administrator to do this. Preferably any such actions taken by the central control arrangement are nonetheless reported to an administrator to enable the administrator to override any automatically applied policies if necessary.

In this way the centralised architecture which represents a centralised point of attack is able to robustly defend itself against possible attacks, including distributed denial of service attacks in the form of multiple requests to establish a secure connection.

The invention also provides corresponding methods of operating a star connected network, a server node and a client node. These methods may be implemented using computer programs which may be stored on carrier means including tangible data storage devices.

BRIEF DESCRIPTION OF THE DRAWINGS

Embodiments will now be described with reference to the following drawings, by way of example only and without intending to be limiting, in which.

DETAILED DESCRIPTION OF THE EMBODIMENTS

Figure 1:
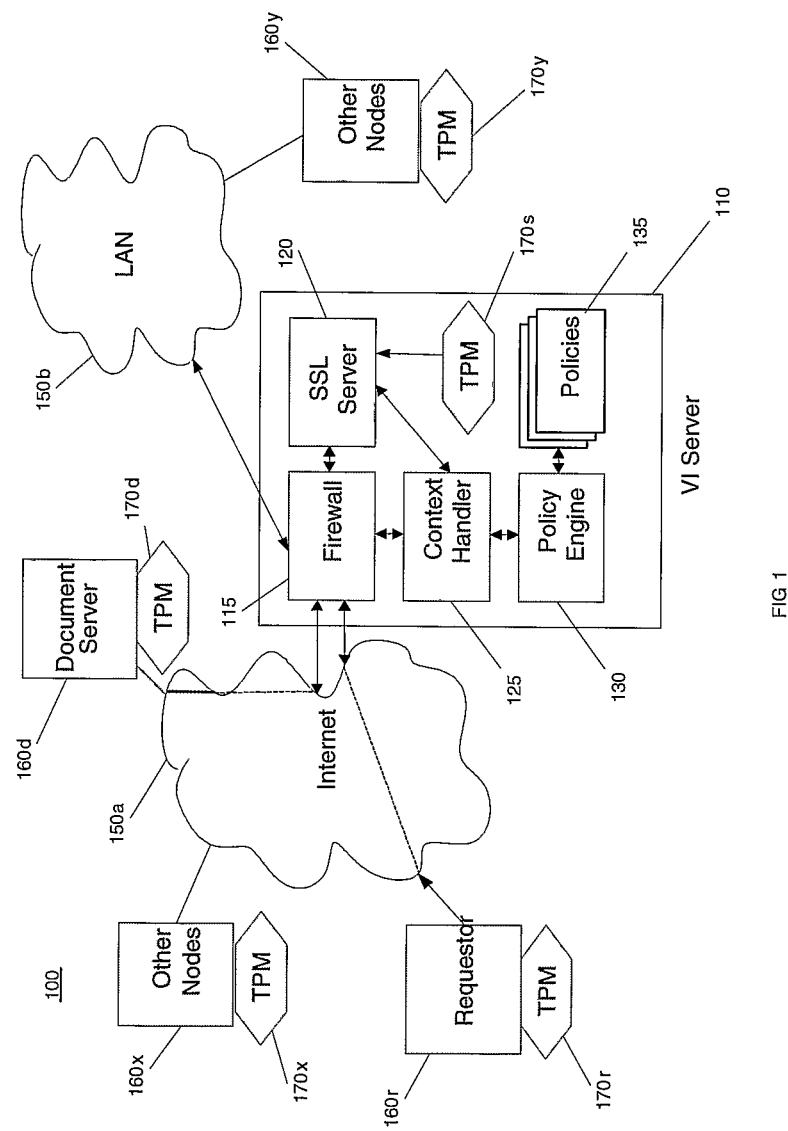
FIG. 1 is a schematic illustrating a network architecture according to an embodiment.

FIG. 1 illustrates a schematic of a secure star connected virtual network implemented over a number of IP or other packet switched networks and according to an embodiment. The secure virtual network or virtual internet (VI) 100 comprises a server node 110 and a number of client nodes 160 coupled to the server node 110 over two packet switched networks 150. In this embodiment the underlying interconnecting networks are the Internet 150*a* and a local area network (LAN) 150*b* operated by the operator of the overlying secure virtual network 100. However this network arrangement is used for simplicity of explanation, and various alternative embodiments could be implemented using different underlying network architectures, for example Internet only, multiple interconnected WLAN and LAN, the Internet and cellular networks, or any number of other combinations of packet and/or circuit switched networks.

Each of the client nodes 160 comprise a trusted platform module (TPM) 170 which is a tamper-proof hardware device integrated into the client machine. The TPM 170 enforces a strict security policy on each client node 160, ensuring that the node 160 only communicates with the central server node 110 over the respective interconnecting networks 150*a* and/or 150*b*. This may be achieved for example by implementing a local firewall and interfacing externally with a port on the TPM 170. Alternatively or additionally software on the client TPM 170 will monitor what processes are running on the client node 160. The TPM 170 will only permit external access to processes or applications that can be configured to only permit traffic to/from the virtual network 100. On document servers and other resources or even destination or second client nodes, an open source apache webserver can be used in which the configuration file is set up to reject requests to public IP addresses, but accept IP addresses associated with the virtual internet server 110. This prevents clients accessing resources from these nodes without going through the server node 110. The TPM 170 also provides each respective client node 160 with authentication credentials such as a secure digital certificate, and secure encryption tools for connecting with the central server node 110. The TPM 170 can also be arranged to require authentication of the user of the client node 160 before allowing traffic to/from the server 110.

The central server node (VI) 110 comprises a packet filter such as a firewall 115, an encrypted connection or session server such as a secure sockets layer (SSL) server 120, a context handler 125, a security policy engine 130, and a store of security policies 135. All connections to the interconnecting networks 150 are via the firewall 115 which matches each incoming and outgoing packet against a series of firewall rules. The packets may be matched against various parameters, for example the source and destination addresses of the packets, the port address, the application which the packet is associated with, and various other security related parameters that will be appreciated by those skilled in the art and which are dependent on the security policies 135 of the server's operator.

Typically the central server 110 will also comprise a TPM 170$s$ which provides the SSL server 120 with authentication credentials such as secure digital certificate for the server, and secure encryption tools for connecting with the client nodes 160.

The SSL server 120 or other encrypted connection server enables the establishment and maintenance of an individual encrypted connection between the server node 110 and each client node 160. Each SSL session is established using mutual authentication and a cryptographic algorithm and keys stored in the TPM's 170 of the respective client node 160 and the server 110. As will be appreciated, each SSL session or connection encrypts and encapsulates packets between the respective client node 160 and the server 110.

Packets received from a client node are then routed through the firewall 115, and if they meet the firewall rules, are then permitted or allowed to pass to the SSL server 120. Typically the firewall rules will interrogate the source and destination addresses of both the received packet and its encapsulated packet payload. The SSL server 120 de-encapsulates and decrypts the received packets to recover the encapsulated packet as usual with SSL operation. The destination address is identified and the packet re-encapsulated, re-encrypted, and then forwarded via the firewall 115 to the destination client node 160. Again the firewall 115 interrogates the outgoing packet according to the firewall rules.

Each client node 160 is therefore effectively allocated to its own individual security domain, and any packets passing to or from other client nodes must pass through the firewall 115. This allows the security policy of the network 100 to be centrally managed and applied to all client nodes 160 of the network 100. This compares with a typical arrangement in which a firewall is used as the security interface between two separate networks, for example the Internet and an internal LAN. Client nodes located within the LAN of existing systems are not subject to the security policies implemented by the firewall, and are assumed to be trustworthy. Similarly, once a remote computer has negotiated the firewall, it is typically given the same access as other users within the LAN security domain.

As an additional security measure the connections between the individual client nodes 160 and the server node 110 are encrypted using the SSL or other encrypted connections facility which is implemented using the TPM's 170 on each client node 160, and in this embodiment the TPM on the server node 110. As a further security measure, the firewall rules are automatically updated when a new SSL connection/session is established with a client node 160, and also when an existing SSL connection/session is terminated for example because a remote user has logged off the Internet 150$a$. Updating of the firewall rules is accomplished using the context handler 125 which is a software module implemented on the server node's processors and which receives a list of current SSL sessions from the SSL server 120. By comparing these with a stored list of previous SSL sessions, or determined from the current firewall rules, the context handler 125 can determine new and terminated SSL sessions and update the firewall rules accordingly. Typically this will involve replacing the existing firewall rules such as iptables on the firewall 115 with a new set including updated rules relating to the client nodes 160 associated with the new and terminated SSL sessions.

In the simplest arrangement, the rules will be updated to now permit or allow packets having source and destination addresses corresponding to the client node associated with a new SSL session. Similarly, the rules will be updated to deny or block packets having source and destination addresses corresponding to the client node associated with a terminated SSL session. Typically however, the rules relating to each client node 160 will be more complex, and may implement restrictions based on employee type for example in which access to certain servers (eg 160$d$) are restricted to certain employee types. Similarly access may be restricted based on location, for example whether a client node is connecting to the server node via the Internet or a local LAN. The context handler 125 will thus request policy details for the or each new client node 160. This may be achieved by inputting a client identifier, for example a network-wide unique number or other reference such as a public key associated with the client node 160$r$ having just established an SSL connection with the SSL server 120. The policy engine 130 queries a database of polices 135 for policy statements relevant to the newly connected client node 160$r$. These policy statements may be unique to the client node 160$r$, or may be associated with a group of such client nodes 160, for example a particular grade of employee. These policy statements are passed back to the context handler 125, which translates them into iptable or other firewall rules for updating the firewall 115. Alternatively the context handler 125 may be configured to forward specifically formatted queries dependent on the new (and/or terminated) client node 160 to the policy engine 130. The policy engine 130 then returns permit/deny type responses for each request for a particular resource (the formatted queries). These responses are interpreted by the context handler 125 and translated into the updated firewall rules.

In this embodiment the policy engine 130 operates with policy statements in a high level language which are then converted by the context handler into iptable rules or other detailed firewall rules. This allows greater flexibility in changing security policies for individual client nodes or groups of client nodes. However the policy engine 130 and context handler 125 functions could be merged, such that detailed firewall rules are automatically recovered dependent on the newly connected client node 160*r*, and these are then written into the firewall.

The embodiment provides a number of advantages. "External" access, that is access from an interconnected network 150*a* not controlled by the operator, to user's of the system or secure virtual network 100 is provided consistently across the network 100; irrespective of whether the user is located on an "internal" network 150*b* also operated by the secure virtual network operator, or whether they are located on the untrusted Internet 150*a*. The system also allows complete control of each user's access rights across the virtual network 100, and helps ensure the security of both client nodes 160, the central server node 110, and the secure virtual network or system 100 as a whole is maintained. By using the spoke and hub or star connected architecture to create a virtual security overlay, users and resources are partitioned into separate security domains which makes it much harder to establish a connection between two devices or nodes without being detected, thus reducing the risks of a successful security-breach attack. This portioning also allows different levels of connectivity and privileges to be granted based on factors such as physical location, machine security posture, and role based privileges. This in turn provides for highly flexible and granular central access control. Also as all system traffic goes, through the central server 110, all system activity can be readily logged and audited; for example to detect intrusions. If need be, the firewall can lock down the entire system in an instant.

An additional advantage is that the use of firewall protected physical LAN's for internal security can be eliminated in favour of an Internet based solution which provides the same or better security at reduced cost—this is especially true for SME. Similarly the use of leased lines for WAN infrastructure is no longer required. Cost savings are also available where security domain partitioning is required, as there is no longer a need for additional firewalls between domains or indeed additional physical network infrastructure, as this domain partitioning can be implemented centrally using the server node 110.

Figure 2:
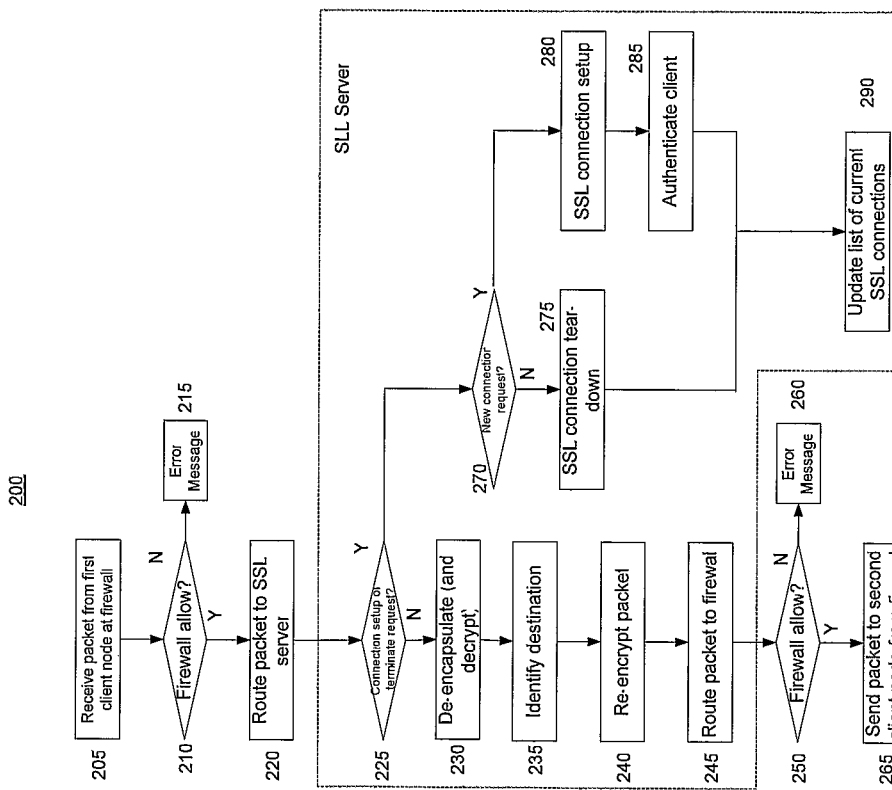
FIG. 2 is a flow chart illustrating a method of handling packets according to an embodiment.
Figure 3:
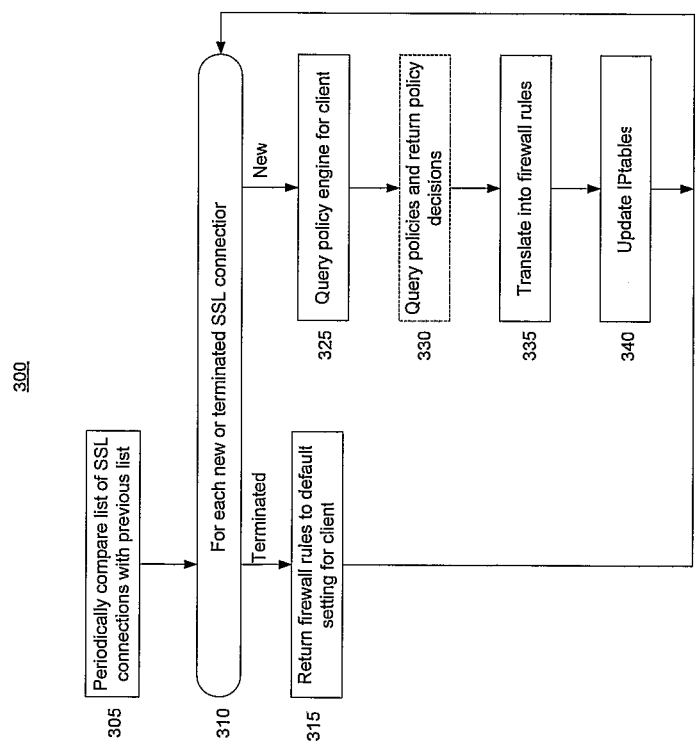
FIG. 3 is a flow chart illustrating a method of querying a policy engine according to an embodiment.

Operation of the system 100 is described in more detail with respect to the methods illustrated in FIGS. 2 and 3. These methods relate to communications between a requester client node 160*r* and a document server client node 160*d*, which are routed via the central server node 110. FIG. 2 shows a method of operating the firewall 115 and SSL server 120. This method (200) initially receives a packet from the first or requestor node 160*r* at the firewall 110 (205). This packet may have been transmitted over the Internet 150*a*, a LAN 150*b* controlled by the same entity as the secure virtual network or security system 100, or a combination of many networks. The packet may be an encrypted SSL or other encrypted connection packet, or a non-encrypted connection packet including for example a request to set up an encrypted connection. The firewall 115 then matches the received packet against a number of firewall rules, typically implemented in iptables as is known. The firewall rules will typically indicate which destination and source addresses are allowed and which are blocked. They may also restrict the ports and application types of the packets which are allowed. Where the packets are SSL packets, the destination and source and perhaps other parameters of the encapsulated packet may additionally be checked—this is known as deep packet inspection to those skilled in the art. Non encapsulated packets associated with the known initial request type for setting up an encrypted connection and addressed to the SSL or other encrypted connection server 120 will typically automatically be allowed (210Y). Packets addressed to another part of the central server 110 will typically be blocked. Where the packet is an SSL packet, the firewall will determine whether the sending client 160*r* is allowed to communicate with the (ultimate) destination client 160*d* by checking the source and destination addresses of the encapsulated packet.

Where the packet is blocked by the firewall for violating one of the firewall rules (210N), an error message may be returned to the sender of the packet (215). For example an error message indicating that the particular communication is not allowed within the star connected virtual security network 100 may be retuned. Where the packet is allowed by the firewall (210Y), the packet is then routed to the VPN or SSL server (220). The SSL server determines whether the packet relates to an SSL connection set-up or termination request (225), and if not (225N) de-encapsulates and decrypts the packet to recover the encapsulated packet (230). As is known, the SSL packet comprises a source address corresponding to the sending client node 160*r* together with a destination address corresponding to the SSL server 120. The encapsulated packet will however comprise a source address corresponding to the sending client 160*r* together with a destination address corresponding to the ultimate destination client 160*d*. The SSL server 120 then identifies the destination address of the encapsulated packet (235), in this example the document server client node 160*d*. The method then re-encrypts the encapsulated packet (240).

The re-encrypted packet, now typically on a different SSL connection between the SSL server 120 and the second or document server client node 160*d*, is then forwarded to the firewall (245). The SSL server 120 will normally be configured such that all outgoing packets are routed towards the firewall 115. The firewall 115 then again checks the packet from the SSL server 120 against the firewall rules (250). As before, this may involve checking the source and destination addresses of the re-encrypted packets, as well as port addresses and application type of the packet for example. Again deep packet inspection may be used in which the de-encapsulated and decrypted packet is also inspected by the firewall. If the packet is blocked (250N), an error message is generated (260) and typically sent to the original sender—the requester client node 160*r*. If however the packet is allowed by the firewall (250Y), the packet is then routed on to the destination or second client node (265), in this example the document server 160*d*.

The packets sent by the requester or first client node 160*r* to the document server or second client node 160*d* may relate to a request for a document. The packets embodying the document are then sent to the requestor node 160*r* via the central server 110 using the SSL encrypted connections set up separately between the document server and the central server, and between the requester node 160*r* and the central server 110 as described above. In this way, all communications between client nodes 160 forming part of the secure star connected system 100 overlaid on the interconnected mesh networks 150*a* and 150*b* are routed via the central server 110 over respective encryption tunnels or connections, and an appropriate security policy applied by the firewall 115 to all these communications.

Where incoming packets from a client node 160 relate to setting up or terminating a SSL connection with the SSL server 120 (225Y), these are allowed by firewall 115. The method (200) then determines whether the packets relate to a new VPN connection request or a request to terminate an exiting VPN connection (270). A request to terminate an existing SSL connection between a client node 160 and the SSL server (270N) results in the connection being torn-down (275) in a manner which will be familiar to those skilled in the art. The SSL server 120 maintains a list of current SSL connections, and this is updated when the connection is torn down (290). Typically the list will comprises the public keys of the respective client nodes 160, these being labelled as terminated or connected as appropriate; alternatively the public keys of the terminated client node connections may simply be removed from the list. Some standard SSL servers 120 may require modification of their software to provide such a list. When the packets relate to a request for a new SSL connection between the requesting client node (eg 160r) and the SSL server 120, an SSL connection setup procedure is implemented (280). The SSL connection setup procedure (280) may employ a known SSL setup method, although it will typically utilise the TPM (eg 170r) of the requesting client node. A certificate authority (CA) will sign certificates for both the server and client's public keys, which are securely stored in the TPM 170r, 170s of the client node 160r and server node 110 respectively. In the SSL protocol, these certificates are exchanged and verified. This allows them to use public key cryptography to generate a session key. The digital certificates are also signed/encrypted using respective private keys stored in the TPMs. The respective TPM's public keys can then be used to verify that the public digital certificates are from the corresponding TPM. This enhances the security of the system. When the client node (160r) is authenticated (285) by the server node (110), and the SSL connection set up, the list of current SSL connections is updated to include the newly authenticated and connected client node (160r).

In order to enhance security, the firewall rules used by the firewall 115 of this embodiment are updated automatically in response to changes in the current SSL connections maintained by the SSL server 120. Thus for example, when a client node (eg 160r) has not established an SSL connection with the SSL server 120, the firewall rules block any packets to or from this client node (160r). The exception to this rule are non-encapsulated packets from the "unconnected" client node (160r) addressed to the SSL server 120 (and non-encapsulated packets from the SSL server 120 to the client node 160r) which relate to setting up an SSL connection. In addition to allowing or blocking packets based on whether a SSL connection has been established with the respective client node 160, the firewall rules will additionally implement a higher level security policy. Such a policy may restrict communications between a particular node 160r and other client nodes 160. This may be based on certain parameters relating to the normal or assigned user of the client node 160. For example, a user may not have access to the human resources database or other sensitive data of an enterprise unless the user is from the relevant department. In addition, access to certain other client nodes (eg 160y) may be restricted when the user is connected to the system 100 over the public internet 150a, but not when they are connected over the enterprise's internal LAN 150b. Similarly, access may be restricted based on the type of application that packets to/from the client node 160 relate to. For example, a particular user's client node 160r may be restricted to checking email when connecting via the public internet 150a, whereas this restriction may not be implemented when connected via the internal LAN 150b. Various other security restrictions of this nature will be appreciated by those skilled in the art, and are intended to be facilitated by the embodiment.

In order to implement these features, the embodiment utilises a context handler 125 and a policy engine 130. Operation of these functions is described with respect to FIG. 3, which illustrates a method of operating the context handler 125. The method (300) periodically queries the list of current SSL connections maintained by the SSL server 120 (305). This may be compared against a previous list in order to determine new SSL connections which have been established and old SSL connections which have since been terminated. For each terminated SSL connection ($310_{Terminated}$), the method returns the firewall rules relating to the client node to a default setting; typically blocking all packets to/from the client node except those relating to setting up a new connection with the SSL server 120 (315). A set of global firewall rules relating to setting up new SSL connections is maintained, and any rules relating to additional access rights for the terminated client node are deleted.

For each new SSL connection ($310_{New}$), the method queries the policy engine 130 for the client (eg 160r) associated with the new SSL connection (325). Typically this will involve formulating a standard query format policy request including details such as a system unique identifier for the client (IDclient) for example the client's public key, and a destination address for the client (Addr-dest) in order to establish for example which network (150a or 150b) the client device is using to connect to the system 100. This information is available from the list maintained by the SSL server 120, and is recovered and translated into the appropriate format for the policy engine 130 by the context handler 125 operating according to this method (300). Some other details that may be used in making policy decisions include: source/destination ports, finer details on requested destination (directory, file, database entry), environmental details, time/day/date, current system load. An example implementation using KeyNote™ for the policy engine 130 and iptables for the firewall is described in more detail further below.

The policy engine 130 receives the request from the context handler 125 and queries the various security policies 135 stated by the operator of the system (330). In order to facilitate flexible management of the security policies 135, these are typically stated in a high level language such as Keynote™, where single policies can be applied to various groups of clients for example. Implementing these as individual firewall rules in an iptable for example and which relate only to the individual clients can be achieved by a suitable translation function in the context handler 125. The policy engine 130 determines whether there are any matches against the security policies 135 for the client identity received from the context handler 125 (330). If there are no matches then the firewall rules are not updated, and this will typically mean that the requesting client node has no access privileges under the security policies 135. Packets to/from this client will therefore continue to be blocked by the firewall 115. If however the client identity matches one or more security policies, these matching policies are used to return permit/deny decisions to the context handler's queries from the policy engine 130 (330). The policies may restrict the destination addresses to which the client node packets may be forwarded to or received from, for example based on the location of the client node 160. Similarly port numbers and application types may also be restricted. Various other access restrictions will be appreciated by those skilled in the art and may be implemented by the embodiment. The policy decisions returned by the policy engine 130 are then translated by the context handler 125 into firewall rules (335). The particular firewall rules corresponding to the policy decisions will depend on the firewall 115 implemented, and a typical example is iptables although other types could be used. The use of a high level policy engine 130 together with a context handler 125 allows a modular approach to be adopted to implement the automatic firewall updating. Thus for example if a different firewall 115 is to be implemented, this may only require modification of the context handler's translation software. However in an alternative embodiment the context handler 125 and policy engine 130 functions may be merged into a single software module.

Having obtained the firewall rules relating to the newly connected client, the IPtables of the firewall 115 are updated (340). This may be implemented by rewriting all of the iptables with the additional or changed rules for the newly connected client, and refreshing the firewall as is known. Once the firewall rules have been updated, the client connected to the SSL server 120 may now forward/receive packets to/from other client nodes via the SSL server 120 with each packet being allowed or blocked by the firewall 115.

Although the encrypted connections have been described as SSL, various other cryptographic tunnelling techniques could alternatively be used, including for example IPsec and Transport Layer Security (TLS). Also whilst normally SSL requires a browser which would limit the applications that can be implemented, various SSL software clients such as Stunnel exist which can be used to implement SSL capability in a non-browser application which doesn't have this natively (eg an email client).

The SSL tunnels or VPN's can be run over a virtual LAN (VLAN) architecture such as Ethernet over SSL. Example packages include OpenVPN and OpenSSL. These packages do not require dedicated hardware such as another firewall and a VPN concentrator, and can be implemented with software only.

Various Linux open source applications can be used to create layer 2 (eg Ethernet over TCP) encrypted connections. Brctl Linux Ethernet Bridging software allows packets to be forwarded based on Ethernet addresses rather than IP addresses. This means all higher layer protocols can go transparently through the bridge. A bridge will be required for each client node's physical networking interface that will be tunnelled. A bridge will also be required for the server in order to bridge virtual interfaces, in other words to by-pass the server's own operating system interface drivers; for example to enable encryption over the encrypted connections. A server bridge is required for each VLAN or VLAN group which may include a number of client nodes 160. Stunnel can be implemented on both clients and the central server to request and create SSL connections respectively. Thus Stunnel allows encryption of arbitrary TCP connections inside SSL in order to provide the various SSL tunnels on top of the VLAN tunnels. VTun can be used on the client to bind a physical interface to a virtual interface that is brought up by the vtun session. This is done by invoking the loopback interface and then invoking Stunnel. Vtun on the server binds new tunnels together at layer two to create a number of virtual Ethernets. A single instance of Vtun server runs a single configuration file which defines the details of the VLAN/bridging groups.

Figure 4:
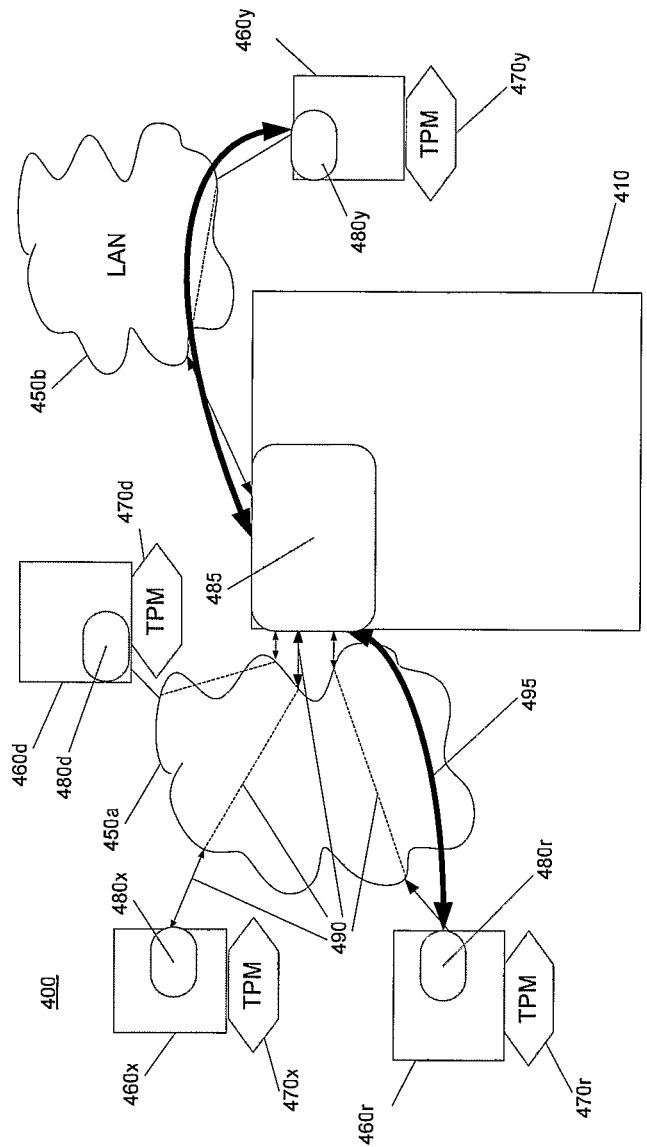
FIG. 4 is a schematic illustrating a star connected network security overlay for an underlying network.

FIG. 4 illustrates a star-connected network 400 implemented over the network architecture (100) of FIG. 1. The star connected network 400 has the central server node 410 as its star connection point, with each of the client nodes 460 being connected to the server node 410 using encrypted connections such as SSL sessions 490. A software module 480 is installed on each client node 460 and which includes various software and/or hardware facilities to enable the encrypted sessions (eg Stunnel) and to restrict communications from the client's communications ports to the central server (eg a modified personal firewall and/or an apache webserver). In the VLAN embodiment mentioned above, the software modules 480 will also include Brctl and Vtun in order to implement a VLAN architecture at layer 2 in order to optimise communications between the client nodes and the server node 410 within the star-connected network configuration. The central server 410 also includes a corresponding software module 485 which in this embodiment includes Stunnel, Brctl and Vtun in order to implement the SSL sessions 490 and the layer 2 VLAN architecture for implementing the star-connected network 400. The figure illustrates communications between two of the client nodes 460r and 460y being directed via the server node 410 over the separate SSL connections 490—as generally illustrated by reference 495.

Whilst a VLAN approach has been described in order to implement the star connected network 400 over the existing Internet 450a and other networks 450b, together with existing Linux based software tools, various alternative approaches could also be used. For example for a small star connected network 400, SSL connections 490 could be simply implemented over the Internet or a LAN without the use of VLANs. In this case Stunnel or some other VPN based technology may be added to the client and server nodes in order to implement the SSL connections. In a further alternative, alternative VPN based technologies could be used such as Point-to-point Tunnelling Protocol (PPPTP), Layer 2 Tunnelling Protocol (L2TP), L2TPv3, Multi-Protocol Label Switching (MPLS), and Layer 2 Forwarding (L2F). Also whilst various specific software packages have been mentioned as being suitable for implementation in the embodiment, the skilled person will be familiar with other software packages from Open Source or Proprietary Sources which can alternatively be, used with or without minor modifications.

The TPM's 170 can be used to enforce the security policy that external communications on a client node 160 must only be made with the VI server node 110. The TPM will typically require the user of the client node to authenticate itself to the TPM in order to facilitate VI access. This may be accomplished using a password and/or a measured biometric parameter from the user.

In the embodiment described with respect to FIGS. 1 to 3, a KeyNote™ policy engine can be used together with a firewall using iptables. Iptables are typically static and fixed, as well as being complex. However in some embodiments these can be manipulated dynamically. To make administration easier, the security policies are stated in a basic format, and then interpreted and executed at runtime. KeyNote processes a correctly formatted query against a set of policies. The policies are implemented in terms of Authorizer, Licencees, Conditions, Signature.

The authorizer is the public key of the entity with authority to create all policies—the operator of the server node 110 and hence the virtual network 100. This is securely stored in the server's TPM 170s and may also or alternatively be hard coded into the server 110 code so that an attacker cannot substitute their own key. The licensees of a given policy will be the public keys of the users to be granted access, which will be TPM generated. The conditions will determine the necessary conditions for a user to be granted access, for example: a unique identifier for the policy, a valid period for the policy, applications that the user is allowed access to. The signature field is the digital signature of the contents of the policy signed with the authorizer's private key. This is a TPM private key, and can only be signed by the key on that particular the server node or a special dedicated remote node.

The policy engine reads the clients public key, and queries the policies to derive what access the client is allowed. The query includes: the client's public key; the name of the application; current time; list of revoked policies (each policy has to be revoked separately). These details can be established by the context handler prior to submitting the query. The policy engine then returns a list of allowed resources/actions.

Preparation of the queries for the policy engine 130 is performed by the context handler 125 which recovers the required information from the SSL server 120, and performs a suitable translation. Similarly, when the list of allowed actions/resources is recovered from the policy engine 130, the context handler 125 translates these into iptables for updating the firewall 115.

Figure 5:
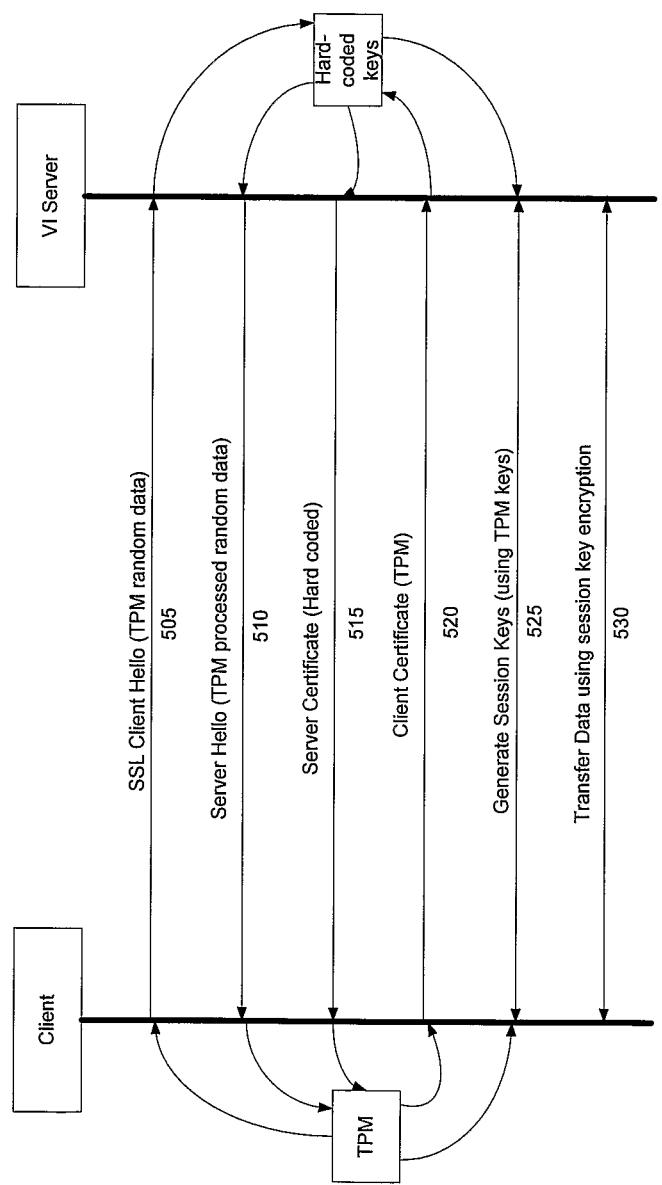
FIG. 5 is a method of establishing an encrypted connection between a server node and a client node according to an embodiment.

FIG. 5 shows a modified SSL connection setup method in which the TPM facility on the client device is used, together with a corresponding hard-coded key on the VI server. The client initially sends the server an SSL Client Hello message (505). This includes random data generated by the TPM 170 of the client node 160. The message also includes standard SSL handshaking information such as Highest SSL version, Ciphers Supported, Data Compression methods, and a Session ID. This client hello message is received by the SSL server 120 and processed in the normal way known to those skilled in the art. In addition, the random data is processed using a predetermined key and algorithm which may be hard-coded into the SSL server 120, or stored separately but securely on the TPM 170s of the central server 110. This processed random data is then included in a server hello message sent to the client node in response to the client hello message (510). The server hello message typically also comprises the selected SSL version, the selected cipher, the selected data compression method, and the assigned session ID as is known. This is received by the client node, and the processed random data may be used as part of the subsequent authentication process.

The server then forwards its digital certificate (515), including its public key which is signed by a CA The server's public key is typically hard-coded into the SSL server code so that it is not possible for a malicious entity to change it. The server's certificate is received by the client node 160, and authenticated using the private key stored on its TPM 170. This typically requires user authentication by the TPM, for example by entry of a password or other login procedure by the user at the client node 160 in order to ensure the identity of the user. The client 160 then retrieves its own digital certificate from its TPM 170 and which is signed by the CA. This certificate, including the client's public key and authentication signature is sent to the server (520). The server authenticates the client's certificate as is known. The client node 160 and SSL server 120 then negotiate session keys (525), typically using the random data initially sent in the client hello message with a Diffe-Hellman exchange. Following session key agreement, encrypted data transfer between the client and server can be performed (530) as normal.

Figure 6:
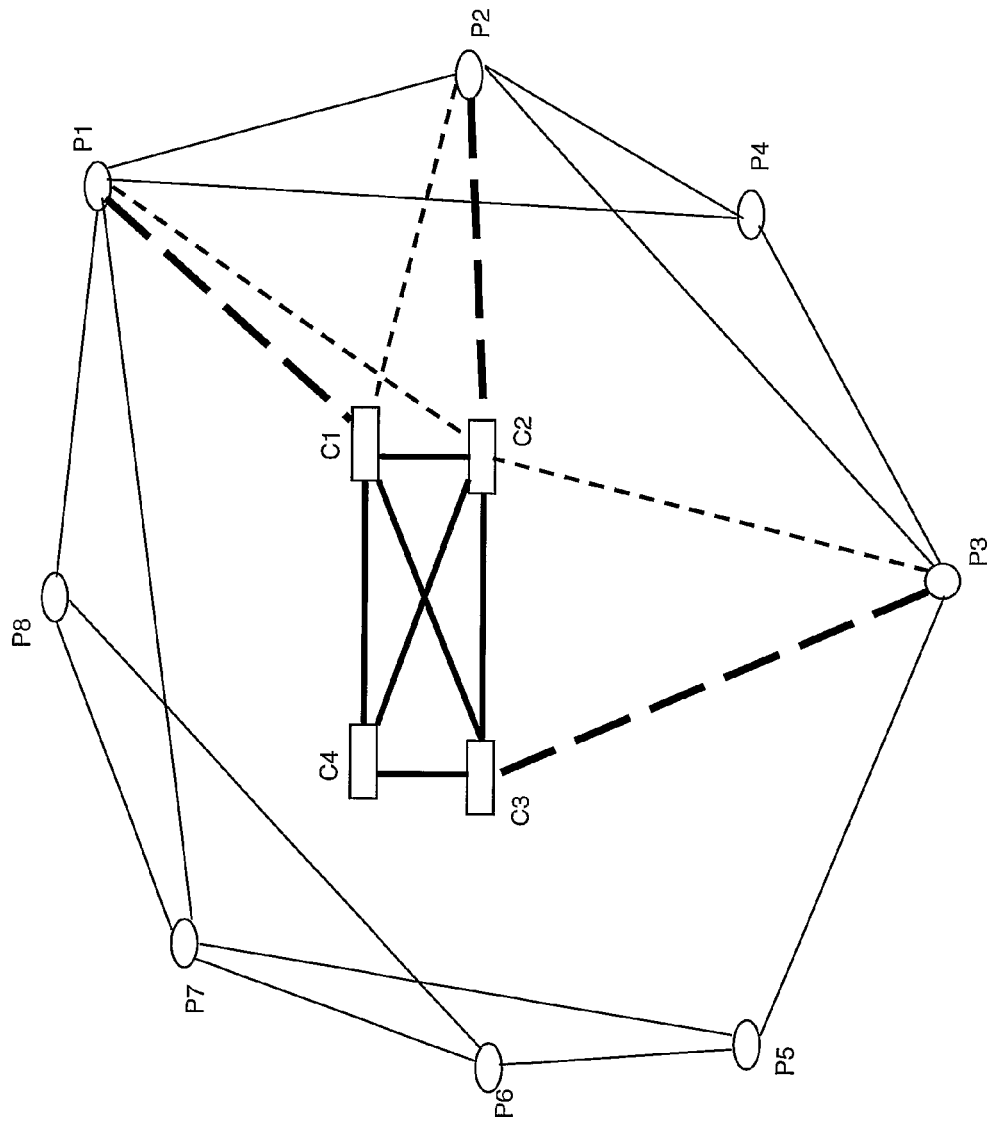
FIG. 6 is a schematic similar to FIG. 1, but illustrating a network architecture according to another embodiment.

FIG. 6 shows an alternative embodiment in which the central server function is distributed between a plurality of central servers C1, C2, C3, C4. The central servers are interconnected between themselves. Since the central servers operate to provide a Virtual Intranet (VI), they will hereinafter be referred to as VI central control servers C1-C4. FIG. 6 also shows a plurality of local peripheral client nodes P1-P8. As well as having various direct connections between peripheral nodes, each peripheral node has at least two direct connections to VI server nodes; however, in FIG. 6, for clarity, just the connection for three peripheral nodes P1, P2, P3 are presented. VI servers are partially or fully meshed, i.e. each VI server is connected to more than two other VI servers to introduce more reliability and redundancy so that high availability and load balancing can be achieved. Also, each peripheral node connects directly to at least two VI servers, one is a default server, the other is a back-up server. In FIG. 6 therefore, it can be seen that P1, P2 and P3 have default central servers C1, C2 and C3 and back-up central servers C2, C1 and C3 respectively. The information required to perform the VI server functions as described above is distributed across the overall network of VI servers.

Variations

In many situations it is beneficial for a network to have separated control and data planes. This can help both to improve the performance of the network (in terms of the speed of transferring data) and to improve the security of the network (it is harder for a malicious customer to access the control plane when generally customers are restricted to using only the data plane).

This can be achieved (to a certain extent) in the Virtual Intranet of the present embodiment in the following manner (referring again to FIG. 6 as an example network). In the period of system bootstraping, the network should converge based on current network topology using a traditional IGP such as OSPF. Thereby each VI server can calculate the path between all pairs of peripheral nodes. Additionally, conventional remote access techniques can be used to permit remote and or mobile nodes (e.g. an employee's home pc or laptop) to connect to the central control arrangement using a conventional remote access protocol such as RADIUS.

When any peripheral node wants to connect to another peripheral node for obtaining any service or application, even though there are direct links between some pairs of peripheral nodes, they are not allowed to make a direct connection without authorisation from the distributed, central VI control server function. Instead therefore the requesting peripheral node has to send an initial request to its default VI server for consideration. For example, suppose P1 wants to connect to P3, it has to send the request to its default control node C1, C1 can authenticate P1 and investigate if P1 has the privilege to use the requested service based on the security policies locally stored. After the authorisation process, C1 starts to send the request information to the destination peripheral node P3.

C1 knows that C3 is the default VI server for P3 and is currently up and running. Because of the IGP protocol, C1 knows how to send a request to C3 via a direct link (or other intermediate VI servers if there is no direct connection). C3 can then forward the request to P3. If P3 can cope with the request, it sends a "Request accept" message to C3 and C3 passes it on to C1 and then C1 can start the inquiry process for every intermediate node (which may be, and in the present. example are, all client nodes) to make sure that they have sufficient resources to provide the transit services. Finally C1 sends the "Request accept" message to P1 and informs it of the route to P3. P1 can start a dialogue with P2, inform P2 the following packet will target at P3. Since P2 has the command from C2 to provide transit service to P1, it can then accept the packets from P1 and forward all packets to P3.

Preferably the packets are sent in an encrypted form using a suitable protocol for achieving this in a secure manner such as, for example, Transport Layer Security (TLS) protocol or Secure Sockets Layer (SSL) protocol. This is similar to the main embodiment as described above except that instead of having two separate SSL connections there is just one such connection, possibly bridging one or more intermediate nodes, but unlike the case of the main embodiment, there is no need for any intermediate nodes to perform encryption or decryption, only the two communicating nodes need to do this. Indeed, even if the connection goes via a VI server node (or the sole server node in non-distributed embodiments), by not having the VI server node(s) perform both decryption and encryption as an end-point of two separate SSL connections, considerable processing resources of the VI server node(s) are saved. Furthermore, avoiding the need to have the VI server node or central firewall (e.g. forming part of the central control arrangement) perform deep packet inspection on each incoming packet once an authorised connection has been set up, also saves processing resources of the central control arrangement. It is this avoidance of intensive processing requirements, especially encryption/decryption and preferably also deep packet inspection, of the central control arrangement once a "direct" connection has been established which characterises a direct connection as the term is used in this specification, rather than that individual packets should not traverse intermediate nodes (especially when they are operating as routers or switches, etc.) in transit between the destination peripheral nodes.

As is typical for resource negotiation and reservation processes such as that described above, if the destination client cannot handle the request or provide the required services, the requesting client is informed of this (and it can then decide what to do about it, e.g. try again later or try to find an alternative source); alternatively, if an intermediate node cannot provide the required transit resources, an alternative route may be sought. For example, if P3 cannot satisfy the request as service supplier, it sends a "request rejected" message to C3, and subsequently C3 forwards it to C1 and C1 informs P1. Otherwise, if any of the intermediate clients such as P2 cannot provide the transit services for P1, they inform their respective default VI server (e.g. P2 would inform its default VI server C2 and C2 would pass the message to C1). The coordinating server (i.e. the default server for the requesting client, namely C1 in the present example) may then try to find an alternative path (e.g. for P1 to reach P3) by running IGP or some other similar route finding protocol and eventually may get an alternative path (such as P1-P4-P3) and then a similar process to that described above is carried out.

In general, control information such as network routing information, request initialisation, authentication, authorisation, system logging, security policy management, etc. is all handled by the VI server (whether distributed or not). The customer traffic is normally delivered by intermediate clients. This helps release the load of the VI server by avoiding having the relatively large amount of customer traffic (data) compared to the control traffic go via the VI server, this also has security benefits of significantly reducing the possibility of a Denial of Service (DoS) attack launched via customer data plane (i.e. trying to overwhelm the VI server by transmitting a massive amount of data (although there should be a low risk of this since only authorised (and possibly only authorised devices which have been checked via a TPM.as being uncompromised) should be allowed to send data at all). Furthermore, by reducing the workload of the VI server, it will also be more robust to DoS attacks comprising unauthorised devices attempting to initiate connections without any hope or intention of actually initiating a connection or sending any data.

One way of using the TPM to prevent peripheral nodes from setting up a direct connection to one another without authorisation from the control arrangement is to provide that a node will only allow an incoming direct connection to be made to them (i.e. they will only complete an incoming direct connection to them) from any node other than the central control arrangement, if this has been authorised by the central control arrangement and if the credentials provided by the connecting node correctly authenticate the node as the identified node. These trustable credentials can be provided using the TPM of the connecting node. With this arrangement, a system administrator can arrange that the most sensitive devices (e.g. file servers storing company sensitive information) can only be contacted by legitimate and uncompromised devices; typically, devices such as file servers will not normally need to establish connections themselves so there is little risk of them inadvertently contacting a possibly compromised machine, so even given the risk that less critical nodes (e.g. lap-tops of employees) could become compromised and allow connections to be made to it from unauthorised devices, or to attempt to make unauthorised connections, this will not pose so great a security threat (as if unauthorised devices could initiate unauthorised connections with uncompromised nodes whose integrity is vital to a company's security). This can be done in addition to or instead of more conventional uses of a TPM to ensure that a device's integrity has not been compromised by unauthorised addition or modification of software running on the device.

Internal Passive Monitoring

As the Virtual Intranet server architecture is based on a virtual star topology for all of the clients it serves, it is necessary for all communications between devices to traverse the Virtual Intranet server. Therefore if the VI server performed "deep packet inspection" on all the tunnel end points then every single flow in the virtual network can be inspected, logged and if required reported or even blocked. As the tunnels are terminated and de-capsulated low layer two packets are presented to a virtual LAN segment using a virtual interface, it is at this point that the packets will be inspected and rebuilt in to TCP flows using a software Intrusion Detection System (IDS) library. As each new tunnel is established a new IDS process will be invoked, thus ensuring that all connections are monitored.

This function is extremely useful since it can be used for internal monitoring of the information transactions and behaviour of every client. For example, it may be configured to raise alarms to a system administrator to indicate, for example, that some abnormal behaviour such as sending large amount of documents, accessing the system frequently in out of working hours or trying to guess passwords without the necessary authorisation, etc is occuring.

External Attack Detection

Each VI server is protected by the signature-based Intrusion detection system, which is very accurate at identifying known attacks, however it cannot spot any new types of attack. In the VI infrastructure, the VI server can be a central point at which an attacker may launch various attacks. For example, malicious people can utilise a low rate DDoS attack technique by sending requests at a relatively low rate (e.g. less than 5 packets per second) but which require a relatively large computational effort to be dealt with by the such as authentication, access control, etc. It is a co-ordinated activities, that tries to hide their intention for attacking the network, and normally ignored by IDS system, but aiming at over-loading the computational capability of VI server and downgrading its performance. When one VI server identifies some anomaly such as large amount of failed authentication, dropped packets, etc, it starts to analyse the behaviours of all these requests and create the basic pattern for these packets such as head, source address, destination address, pay load, message, etc. In straightforward case, it can create new signature for attack and alert the network administrator for manual analysis. After being confirmed manually, it can then broadcast the new signature to all VI servers and ask them to update their signature database. Otherwise, it will send the summary of suspect behaviour to all VI servers, and obtain the responses. Then it can use some "event correlation techniques" to create the signature for new attack or treat it as a false alarm. In general, each VI server keeps all its system logging information local in normal circumstance, the data will be stored in VI server for a fixed time (i.e. 3 days) depending on the operational requirements, then transfers the data that is out of date to a local storage disk or storage network.

As the VI server provides the entire network service and every point on the network is monitored by the process described above, a greater quality of threat assessment and anomaly detection can be achieved.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array).

Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A star-connected network having a number of peripheral nodes and a central control arrangement; wherein
   each peripheral node is restricted in terms of which types of direct communications it can set up across the network to being able to set up direct communications to the central control arrangement using a respective encrypted connection but not being able to set up communications directly with any other of the peripheral nodes unless at least it or the respective target peripheral node has received explicit authorization from the central control arrangement to establish or complete the direct communication; and wherein
   the central control arrangement comprises a processing system, including a computer processor, the processing system being configured to:
   establish an encrypted connection with each peripheral node;
   exchange control packets with two or more peripheral nodes using two or more respective encrypted connections in order to set up an authorized connection between two peripheral nodes;
   store in a database, security policy information specifying what connections between peripheral nodes are allowable; and
   authorize connections which are allowable according to the stored security policy information using the control packet exchange.

2. The network according to claim 1, wherein
   the functionality of the central control arrangement is distributed between a plurality of central control server nodes.

3. The network according to claim 1, wherein the processing system is further configured to:
   establish encrypted connections with each peripheral node via a virtual private network server which is configured to receive all packets via a firewall which will drop all packets unless they are either directed to or originating from the central control arrangement or they associated with an explicitly authorized connection between two peripheral nodes where the direct authorized connection goes via the virtual private network server.

4. The network according to claim 3, wherein
   the central control arrangement includes an attack detection module which is operable to analyze connection attempts which fail to be authorized and to attempt to detect any patterns in such failed attempts.

5. The network according to claim 1, wherein
   each peripheral node comprises authentication information securely stored in a tamper-resistant hardware module for authentication for establishing an encrypted connection with the central control or with a peripheral node after explicit authorization from the central control arrangement.

6. The network according to claim 4, wherein
   the central control arrangement includes a security policy engine comprising a high level engine for returning a permit or deny decision in response to a client identifier and a number of session parameters provided by a context handler having received an indication of establishment of a virtual private network corresponding to the identified client, the context handler processing the returned decisions into corresponding updated rules.

7. The network according to claim 6, wherein
   the session parameters include: origin and destination network addresses and port numbers.

8. The network according to claim 7, wherein
   the session parameters further include an application identifier identifying the application or the type of application wishing to initiate the connection.

9. The network according to claim 1, wherein
   the star connected network is implemented on one or more interconnected packet switched mesh networks using virtual local area networks to support the encrypted connections.

10. A central control arrangement for a star-connected network having a number of peripheral nodes; the central control arrangement comprising a processing system, including a computer processor, the processing system being configured to:
    establish an encrypted connection with each peripheral node;
    exchange control packets with two or more peripheral nodes using two or more respective encrypted connections in order to set up an authorized connection between two peripheral nodes;
    store in a database, security policy information specifying what connections between peripheral nodes are allowable; and
    authorize connections which are allowable according to the stored security policy information using the control packet exchange.

11. A method of operating a star-connected network having a number of peripheral nodes and a central control arrangement; the method comprising:

restricting communications across the network to communications between the central control arrangement and a peripheral node using a respective encrypted connection unless the peripheral node has received explicit authorization to establish another connection from the central control arrangement;

establishing an encrypted connection between two or more peripheral nodes and the central control arrangement;

exchanging control packets with two or more peripheral nodes using two or more respective encrypted connections in order to set up an authorized connection between both or two of the peripheral nodes;

storing security policy information specifying what connections between peripheral nodes are allowable; and authorizing connections which are allowable according to the stored security policy information and transmitting corresponding authorization messages from the central control arrangement to the respective peripheral nodes.

12. A non-transitory data storage medium storing one or more of the computer programs for carrying out the method of claim 11.

\* \* \* \* \*